(12) United States Patent
Vangsgard

(10) Patent No.: US 6,364,041 B1
(45) Date of Patent: Apr. 2, 2002

(54) MID-AXLE SUSPENSION

(75) Inventor: Kip S. Vangsgard, White Bear Lake, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 09/429,996

(22) Filed: Oct. 29, 1999

Related U.S. Application Data

(60) Provisional application No. 60/106,476, filed on Oct. 30, 1998.

(51) Int. Cl.[7] .......................... B62D 61/10; B60G 3/14; B60G 11/23; B60K 17/36
(52) U.S. Cl. ............... 180/24.12; 180/357; 280/124.13; 280/124.169
(58) Field of Search .......................... 180/24.12, 24.11, 180/357; 280/679, 684, 124.13, 124.128, 124.169

(56) References Cited

U.S. PATENT DOCUMENTS

| | | | |
|---|---|---|---|
| 1,817,028 A | * 8/1931 | Brockway ............... 180/24.12 |
| 1,886,319 A | 11/1932 | Cohen-Venezian | |
| 1,919,033 A | 7/1933 | Noble | |
| 2,226,406 A | 12/1940 | Krotz ....................... 267/21 |
| 2,345,201 A | 3/1944 | Krotz ....................... 267/21 |
| 2,366,166 A | 1/1945 | Willock .................... 280/112 |
| 2,393,324 A | 1/1946 | Joy ........................... 180/17 |
| 2,613,954 A | * 10/1952 | Avila ....................... 280/679 |
| 3,045,774 A | 7/1962 | Hadlock .................... 180/51 |
| 3,057,319 A | 10/1962 | Wagner ....................... 115/1 |
| 3,134,607 A | 5/1964 | Doll ......................... 280/141 |
| 3,159,229 A | 12/1964 | Thwaites .................... 180/51 |
| 3,189,117 A | 6/1965 | Ammon ...................... 180/51 |
| 3,199,486 A | 8/1965 | Gillois et al. ................ 115/1 |
| 3,240,284 A | 3/1966 | Finneman ................... 180/51 |
| 3,292,943 A | 12/1966 | Crockett .................... 280/104 |
| 3,360,067 A | 12/1967 | Scott ........................ 180/51 |
| 3,414,072 A | 12/1968 | Hodges, Jr. et al. ......... 180/51 |
| 3,426,720 A | 2/1969 | Enos .......................... 115/1 |
| 3,437,163 A | 4/1969 | Lemmerman ................ 180/51 |
| 3,520,554 A | 7/1970 | Ravenel .................... 280/124 |
| 3,545,737 A | 12/1970 | Lamprey et al. ........... 267/141 |
| 3,568,788 A | 3/1971 | Mayeaux .................... 180/51 |
| 3,606,373 A | * 9/1971 | Knott et al. ............... 280/684 |
| 3,635,302 A | 1/1972 | Rogers et al. ............... 180/44 |
| 3,669,469 A | 6/1972 | Hartelius .................. 280/492 |
| 3,770,291 A | 11/1973 | Kramer ..................... 280/124 |
| 3,779,576 A | 12/1973 | Malcolm ................... 280/124 |
| 3,977,693 A | * 8/1976 | Gamaunt .................... 180/24 |
| 4,034,822 A | 7/1977 | Stedman .................... 180/51 |
| 4,043,571 A | 8/1977 | Guerbet ..................... 280/716 |
| 4,079,955 A | 3/1978 | Thorpe et al. .............. 280/111 |
| 4,211,297 A | * 7/1980 | Dunbar .................... 180/24.02 |
| 4,809,489 A | 3/1989 | Johansson .................. 56/14.7 |
| 5,337,849 A | * 8/1994 | Eavenson, Sr. et al. .. 180/24.12 |

* cited by examiner

Primary Examiner—Peter C. English
(74) Attorney, Agent, or Firm—Mau & Krull, P.A.

(57) ABSTRACT

A 6×4 utility vehicle utilizes a middle axle (21) which is suspended to the frame of the vehicle by means of a suspension assembly (22). The suspension assembly (22) allows the vehicle (10) to have a better ride quality, ride predictability, increased traction and better maneuverability.

9 Claims, 5 Drawing Sheets

MID-AXLE SUSPENSION

This application claims the benefit of the earlier filing date of provisional application Ser. No. 60/106,476 filed Oct. 30, 1998, entitled Mid-Axle Suspension.

BACKGROUND OF THE INVENTION

1. Field of the Invention This invention relates generally to a 6×4 utility vehicle and more particularly to a 6×4 utility vehicle having its mid-axle incorporate a suspension.

2. Description of the Prior Art

In prior art vehicles, a 6×4 utility vehicle is a vehicle that has three axles. The front axle is used for steering and optionally has a suspension. The two rear axles are not suspended and are connected directly to the frame. Further, both of the rear axles typically are driven.

There is a very real perception by the purchasing public that a 6×4 utility vehicle is very good. That is, the consumers think that the 6×4 utility vehicle has better performance than a 4 wheel, 4 wheel drive vehicle. While it may be perceived as being better, there are serious problems with the 6×4 that are not present with a regular 4-wheel utility vehicle. One of the problems is that the steering of a 6×4 is quite poor. Once a payload is added to the vehicle, the rear four wheels all share pretty much equally the load. Since the four wheels are all bolted to the frame, steering is quite difficult as the payload increases. The rear wheels force the vehicle forward, even though the steering wheels are turned. Further, the ride predictability of a 6×4 is difficult as there is constantly one of the four rear wheels that is off the ground when going through uneven terrain. This tends to throw the vehicle sideways and front to back. Further, the traction is not as good if the tires that are being driven are off the ground and steering is hindered when the front wheels are off of the ground. Another very important problem with a 6×4 is that as one drives it up the hill and proceeds over the crest of the hill, the front wheels come off the ground until the vehicle hits the fulcrum point of the vehicle, then the vehicle teeters and falls forward onto the front wheels with the rear wheels coming off the ground.

The present invention addresses the problems associated with a 6×4 utility vehicle and provides for a utility vehicle which has a suspended middle axle and a solid rear axle.

SUMMARY OF THE INVENTION

The invention is a utility vehicle having a frame and a front axle operatively connected to the frame. Two steerable wheels are operatively connected to the front axle. A rear axle is secured to the frame. The rear axle has operatively connected thereto two wheels. A middle axle is also operatively connected to the frame. The middle axle has first and second wheels operatively connected thereto. A suspension is provided for suspending the middle axle from the frame.

In a preferred embodiment, the middle axle suspension includes a torsional energy absorption member having an inner shaft member, an outer hollow member, and an elastomeric material operatively connecting the inner and outer members. A first trailing arm member has a first end operatively connected to the first wheel and a second end operatively connected to one of said members, the other of said members operatively connected to the frame. A second trailing arm member has a first end operatively connected to the second wheel and a second end operatively connected to one of said members, the other of said members operatively connected to the frame.

BRIEF DESCRIPTION OF THE DRAWINGS

FIG. 5 is an enlarged side elevational view of the mid-axle suspension shown in FIG. 4 taken generally along the lines 5—5.

DETAILED DESCRIPTION OF THE PREFERRED EMBODIMENT

Figure 1:
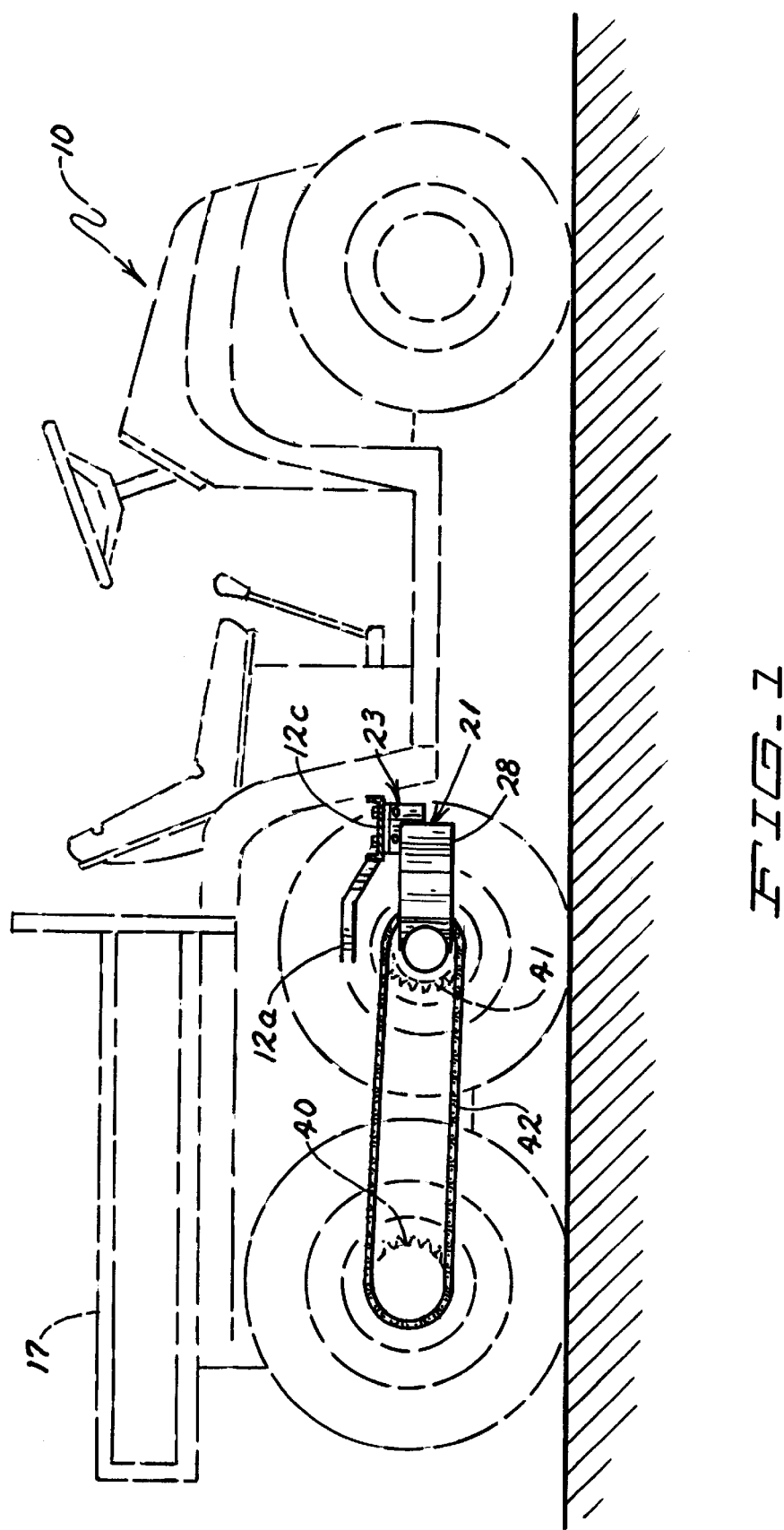
FIG. 1 is a side elevational view of a 6×4 utility vehicle incorporating the present invention.
Figure 2:
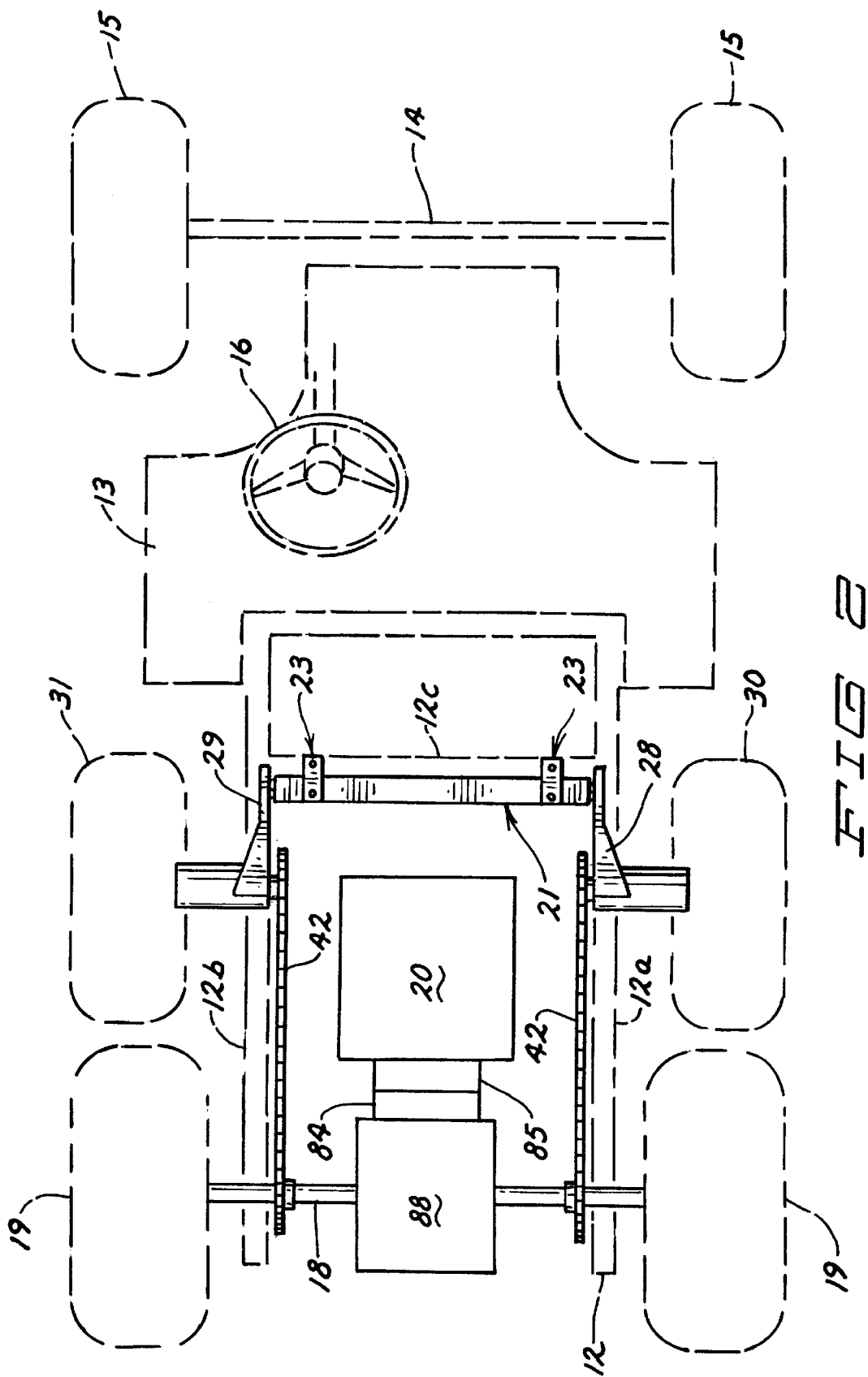
FIG. 2 is a top plan view of the vehicle shown in FIG. 1.
Figure 3:
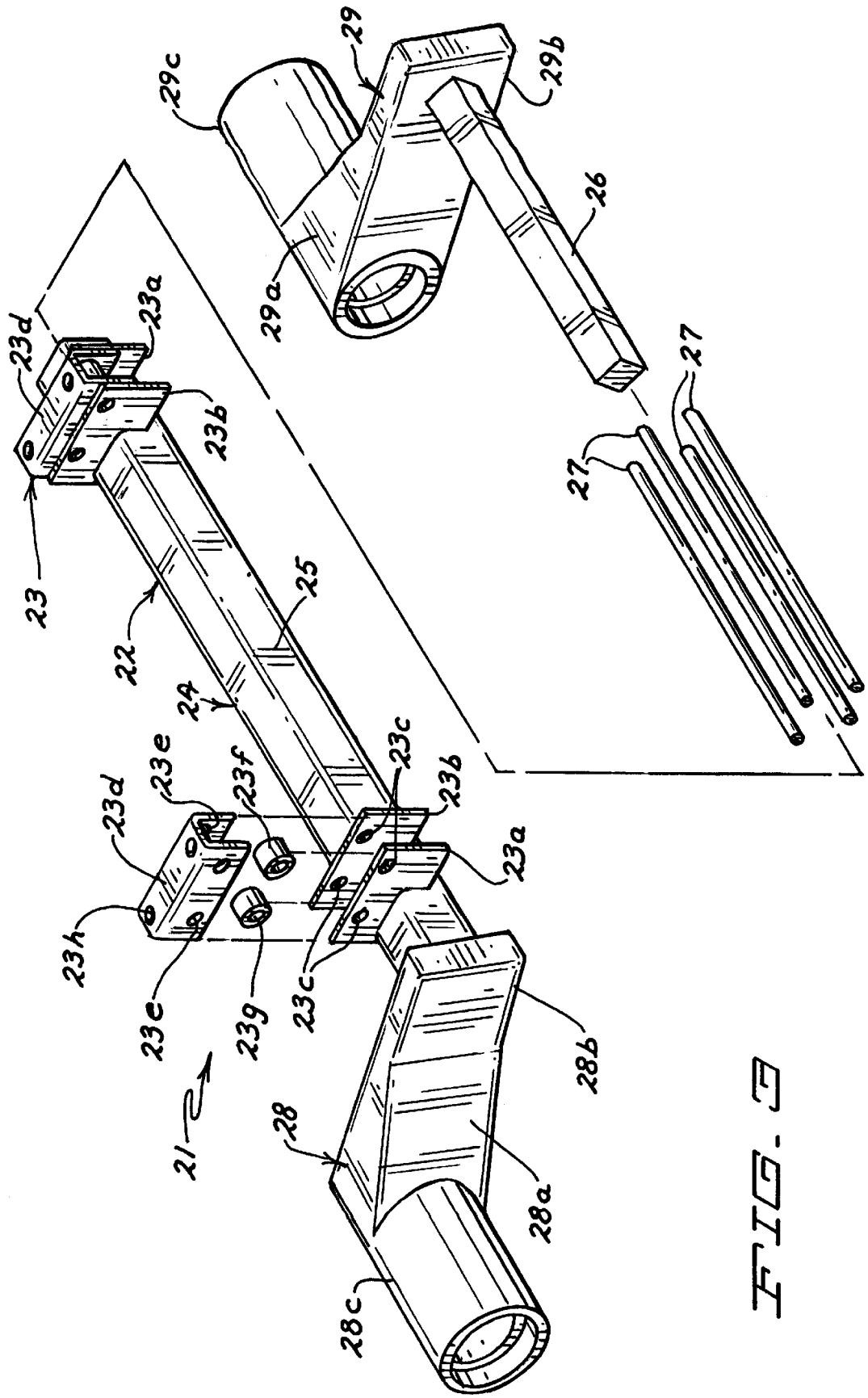
FIG. 3 is a perspective view of the mid-axle suspension shown in FIG. 1, viewed generally from above.
Figure 4:
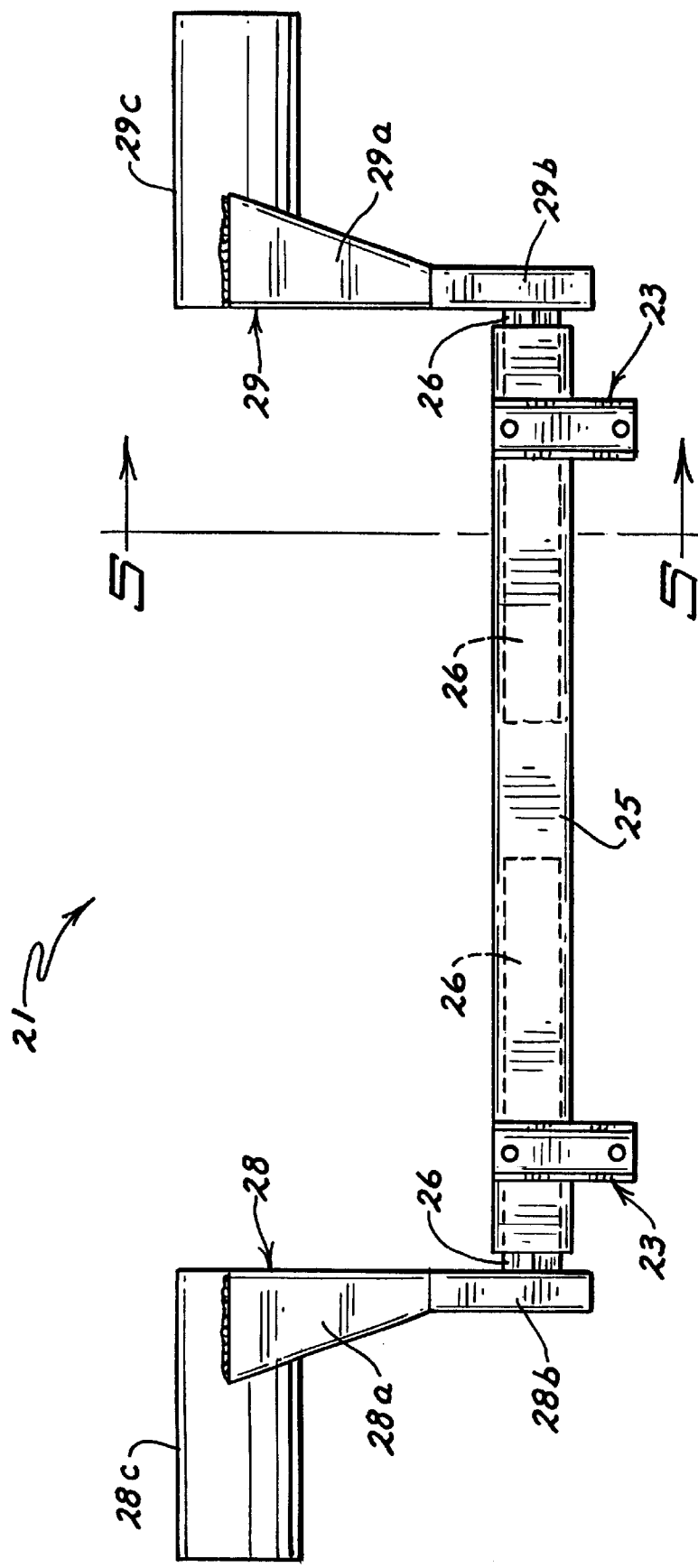
FIG. 4 is a top plan view of the mid-axle shown in FIG. 3.
Figure 6:
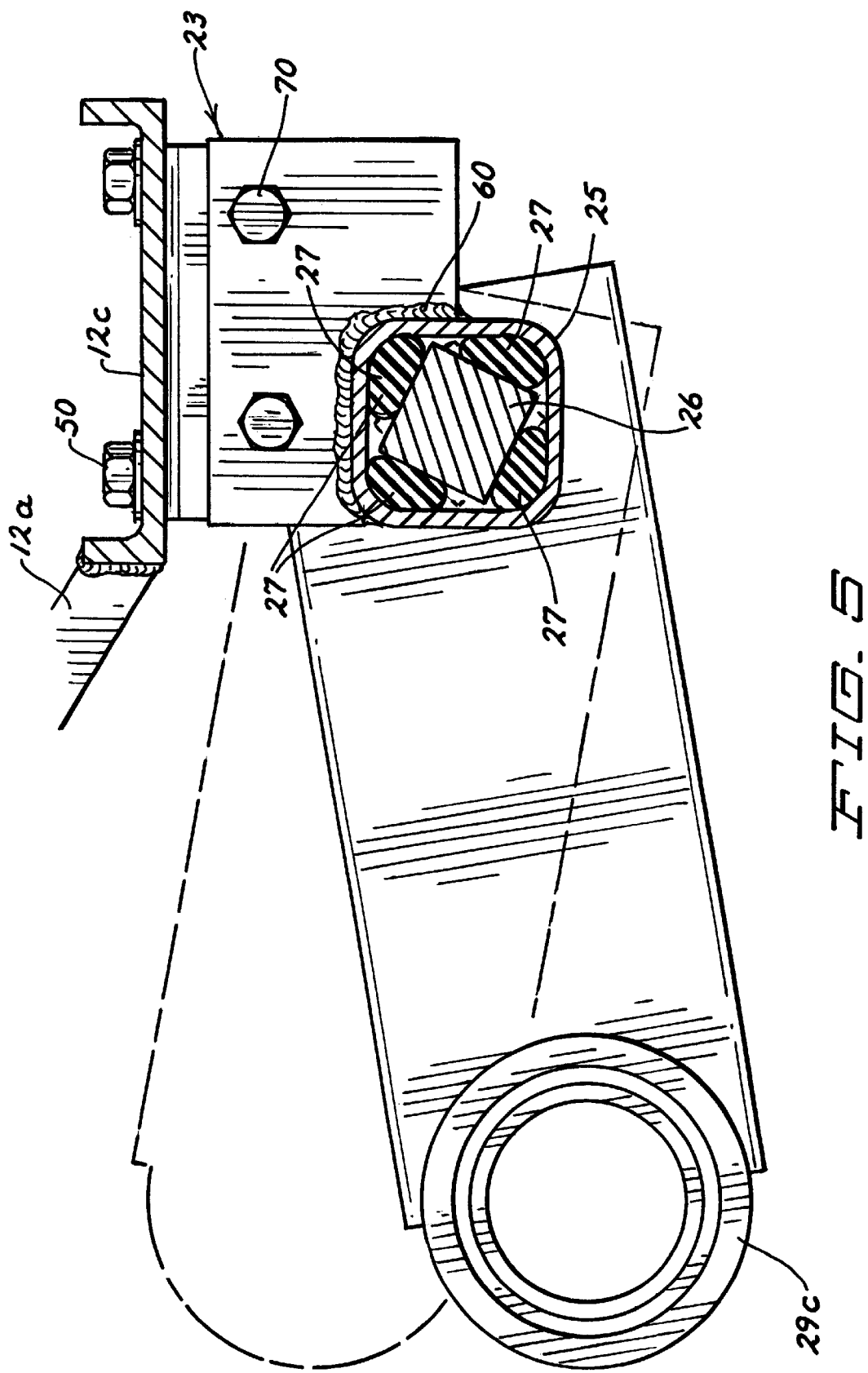

Referring to the drawings, wherein like numerals represent like parts throughout the several views, there is generally disclosed at 10 a 6×4 utility vehicle. The utility vehicle 10 is similar to utility vehicles well known in the art, with the exception of its middle axle. Accordingly, the components of the vehicle 10, other than the middle axle, will be described in general terms as they are well known in the art. The vehicle 10 includes a frame 12 on which an operator cab 13 is mounted. The frame 12 includes longitudinal sections 12a and 12b connected by cross section 12c. The sections 12a and 12b, while generally horizontal, extend upward at approximately 45° proximate the cross section 12c to allow for travel of the middle axle. A front axle 14 has two tires 15 operatively connected thereto. The front axle 14 is preferably suspended by means well known in the art. The tires 15 are steerable by means well known in the art and their movement is controlled by the steering wheel 16. A cargo bed 17 is operatively connected to the frame 12 and is adapted for carrying various loads. A rear axle 18 is operatively connected to the frame 12. The axle is typically bolted to the frame and does not include a suspension. Rear tires 19 are mounted on the axle 18. A motor 20 is mounted on the frame 12. Alternatively, the motor may be mounted on one of the axles. The rear axle 18 is powered by the motor 20 by means well known in the art. A CVT (continuously variable transmission) unit is utilized to drive the rear axle 18. The CVT may be any such mechanism which is well known in the art or may be an other suitable transmission.

The middle axle, generally designated at 21, includes a first trailing arm 28 operatively connected to a second trailing arm 29 by a suspension assembly, generally designated at 22. A pair of brackets 23 are operatively connected to the frame 12 by suitable means such as bolts 50. Each bracket 23 includes a first plate 23a and a second plate 23b. Each plate 23a and 23b is generally rectangular with a notch formed in the lower left corner. The notch is sized and configured to fit around the outer hollow member 25. The plates 23a and 23b are secured by a weld 60 to the outer hollow member 25. The plates 23a and 23b have apertures 23c formed therein. An inverted U-shaped member 23d is sized and configured to fit between the plates 23a and 23b. The U-shaped member 23d has downwardly depending sections that have apertures 23e formed therein. The apertures 23e are in alignment with the apertures 23c. Spacers 23f are positioned inside of the U-shaped member and have apertures 23g which are in alignment with the apertures 23c and 23e. Bolts 70 are inserted through the apertures 23c and 23e and spacers 23f to secure the U-shaped section 23d in position. The top surface of the U-shaped section 23d has openings 23h through which bolts 50 are positioned. The frame section 12c has comparable openings to allow the U-shaped section 23d to be secured to the section 12c.

The torsional susperion member 24 includes an outer hollow member 25 and two inner shaft members 26. Both the shafts 26 and hollow member 25 have generally square cross sections. An elastomeric material 27 operatively connects the inner shaft to the outer hollow member. As shown in FIG. 5, there are four elastomeric members 27 around each shaft 26. However, it is understood that the elastic member 27 may also take other configurations, such as completely surrounding the inner member or shaft 26. Such torsional members are known in the art, such as those described in U.S. Pat. No. 3,545,737. A first trailing arm 28 has a first end 28a operatively connected to the hub 28c of the middle axle by means well known in the art. A second end 28b of the trailing arm 28 is operatively connected to the inner shaft member 26 by suitable means such as welding. Similarly, a second trailing arm 29 has a first end 29a operatively connected to the hub 29c of the middle axle and a second end 29b operatively connected to the inner shaft member 26 by suitable means, such as welding.

A first tire 30 is operatively connected to the hub 28c and the second tire 31 is operatively connected to the hub 29c. The rear tires 19, 30 and 31 are typically nonsteerable, but may be steerable. The motor 20 also drives the middle axle 21 either directly, or preferably by driving the rear axle 18 which is in turn connected to the middle axle 21. Alternatively, only the middle axle or the rear axle may be driven if 4 wheel drive is not desired. One example of such a drive is a CVT unit which would include one clutch 84 operatively connected to the differential 88 and another clutch 85 operatively connected to the engine 20. The clutches 84 and 85, engine 20 and differential 88 are shown only schematically as they are all well known in the art. Two rear sprockets 40 are secured to the rear axle 18 by means well known in the art. Similarly, two sprockets 41 are secured to the middle axle 21 by means well known in the art. Chains 42 are positioned around the sprockets 40 and 41, thereby providing a driving force to the middle axle 21.

The suspension assembly 22 may also be a more typical leaf spring, A-frame or other type of suspension. The suspension for the middle axle 21 will provide for a jounce of approximately 3 inches and also a rebound of approximately 3 inches. The phantom position of FIG. 5 shows the suspension after an upward movement. By adding suspension to the middle axle, the ride quality and predictability of the utility vehicle is greatly increased. There is significantly less jarring to the driver. Also, because the wheels tend to stay on the ground more, the traction is also substantially increased. When a weight is added to the cargo bay, the suspension assembly 22 provides for the majority of the load to be carried by the rear axle. This greatly increases the maneuverability as the middle tires do not carry as much weight and do not scuff the ground as the vehicle is turning, since they are not carrying as much weight as the rear axle.

While the invention described thus far has had no suspension on the rear axle, it is understood that a rudimentary suspension may be used on the rear axle. Such a rudimentary suspension would not be a substantial suspension as is the suspension on the middle axle. Another example of a suspension for the rear axle is a tag axle which would add suspension to the rear axle and still be within the scope of the present invention.

The above specification, examples and data provide a complete description of the manufacture and use of the composition of the invention. Since many embodiments of the invention can be made without departing from the spirit and scope of the invention, the invention resides in the claims hereinafter appended.

I claim:
1. A utility vehicle comprising:
 (a) a frame;
 (b) a front axle operatively connected to the frame, the front axle having operatively connected thereto two steerable wheels;
 (c) a rear axle secured to the frame, the rear axle having operatively connected thereto two wheels the rear axle secured to the frame without suspension;
 (d) a middle axle operatively connected to the frame, the middle axle having operatively connected thereto first and second wheels, the middle axle being a driven axle; and
 (e) a suspension for suspending the middle axle to the frame, the suspension comprising:
  (i) a torsional energy absorption member having an inner shaft member, an outer hollow member and an elastomeric material operatively connecting the inner and outer members;
  (ii) a first trailing arm member having a first end operatively connected to the first wheel and a second end operatively connected to one of said inner and outer members, the other of said inner and outer members operatively connected to the frame;
  (iii) a second trailing arm member having a first end operatively connected to the second wheel and a second end operatively connected to one of said inner and outer members, the other of said inner and outer members operatively connected to the frame; and
  (iv) said one of said inner and outer members having a separate first section operatively connected to the second end of the first trailing arm member and a separate second section operatively connected to the second end of the second trailing arm member.

2. The utility vehicle of claim 1, further comprising:
 (a) the rear axle being driven from a motor; and
 (b) the middle axle being driven from the rear axle.

3. The utility vehicle of claim 2, further comprising a first sprocket operatively connected to the rear axle and a second drive sprocket operatively connected to the middle axle and a drive chain carried on the first and second sprockets for driving the middle axle.

4. A utility vehicle comprising:
 (a) a frame;
 (b) a front axle operatively connected to the frame, the front axle having operatively connected thereto two steerable wheels;
 (c) a rear axle secured to the frame without suspension, the rear axle having operatively connected thereto two wheels, the rear axle driven from a motor;
 (d) a middle driven axle operatively connected to the frame, the middle axle having operatively connected thereto first and second wheels, the middle axle being driven from the rear axle; and
 (e) a suspension for suspending the middle axle to the frame, the suspension comprising:
  (i) a torsional energy absorption member having an inner shaft member, an outer hollow member and an elastomeric material operatively connecting the inner and outer members;
  (ii) a first trailing arm member having a first end operatively connected to the first wheel and a second end operatively connected to one of said inner and outer members, the other of said inner and outer members operatively connected to the frame; and (iii) a second trailing arm member having a first end operatively connected to the second wheel and a second end operatively connected to one of said inner and outer members, the other of said inner and outer members operatively connected to the frame; and (iv) said one of said inner and outer members having a separate first section operatively connected to the second end of the first trailing arm member and a separate second section operatively connected to the second end of the second trailing arm member.

5. The utility vehicle of claim 4, further comprising a first sprocket operatively connected to the rear axle and a second drive sprocket operatively connected to the middle axle and a drive chain carried on the first and second sprockets for driving the middle axle.

6. A utility vehicle comprising:

(a) a frame;

(b) a front axle operatively connected to the frame, the front axle having operatively connected thereto two steerable wheels;

(c) a rear axle secured to the frame without suspension, the rear axle having operatively connected thereto two wheels;

(d) a middle axle operatively connected to the frame, the middle axle having operatively connected thereto first and second wheels, the middle axle being a driven axle; and (e) a suspension for suspending the middle axle to the frame, the suspension comprising:

(i) a torsional energy absorption member;

(ii) a first pivoting arm member having a first end operatively connected to the first wheel and a second end operatively connected to the torsional energy absorption member; and (iii) a second pivoting arm member having a first end operatively connected to the second wheel and a second end operatively connected to the torsional energy absorption member.

7. The utility vehicle of claim 6, further comprising:

(a) the rear axle being driven from a motor; and (b) the middle axle being driven from the rear axle.

8. A utility vehicle comprising:

(a) a frame;

(b) a front axle operatively connected to the frame, the front axle having operatively connected thereto two steerable wheels;

(c) a rear axle secured to the frame without suspension, the rear axle having operatively connected thereto two wheels;

(d) a middle axle operatively connected to the frame, the middle axle having operatively connected thereto first and second wheels, the middle axle being a driven axle;

(e) a suspension member for suspending the middle axle to the frame;

(f) a first pivoting arm member having a first end operatively connected to the first wheel and a second end operatively connected to the suspension member; and (g) a second pivoting arm member having a first end operatively connected to the second wheel and a second end operatively connected to the suspension member.

9. The utility vehicle of claim 8, further comprising:

(a) the rear axle being driven from a motor; and (b) the middle axle being driven from the rear axle.

* * * * *